(No Model.)

A. L. THORNTON.
HAY BINDER, UNLOADER, AND STACKER.

No. 257,534. Patented May 9, 1882.

Witnesses
Lucius C. Thornton
Nettie M. Herrick

Inventor
Alonzo L. Thornton

UNITED STATES PATENT OFFICE.

ALONZO L. THORNTON, OF DOVER, IOWA.

HAY BINDER, UNLOADER, AND STACKER.

SPECIFICATION forming part of Letters Patent No. 257,534, dated May 9, 1882.

Application filed December 31, 1881. (No model.)

*To all whom it may concern:*

Be it known that I, ALONZO L. THORNTON, a citizen of the United States, residing in the town of Dover, in the county of Pocahontas and State of Iowa, have invented a new and useful machine for the binding of loads of hay on a wagon and for the unloading and stacking of loads of hay from a wagon, of which the following is a specification.

The objects of this invention are, first, to provide an easy and effective method of binding loads of hay on a wagon; second, to afford an easy and expeditious method of unloading hay from a wagon and depositing the load as a single bundle on the ground, on a stack, or in a mow. I attain these objects by the mechanism illustrated in the accompanying drawings and by the method I have invented of using the same, as hereinafter described.

Figure 1:
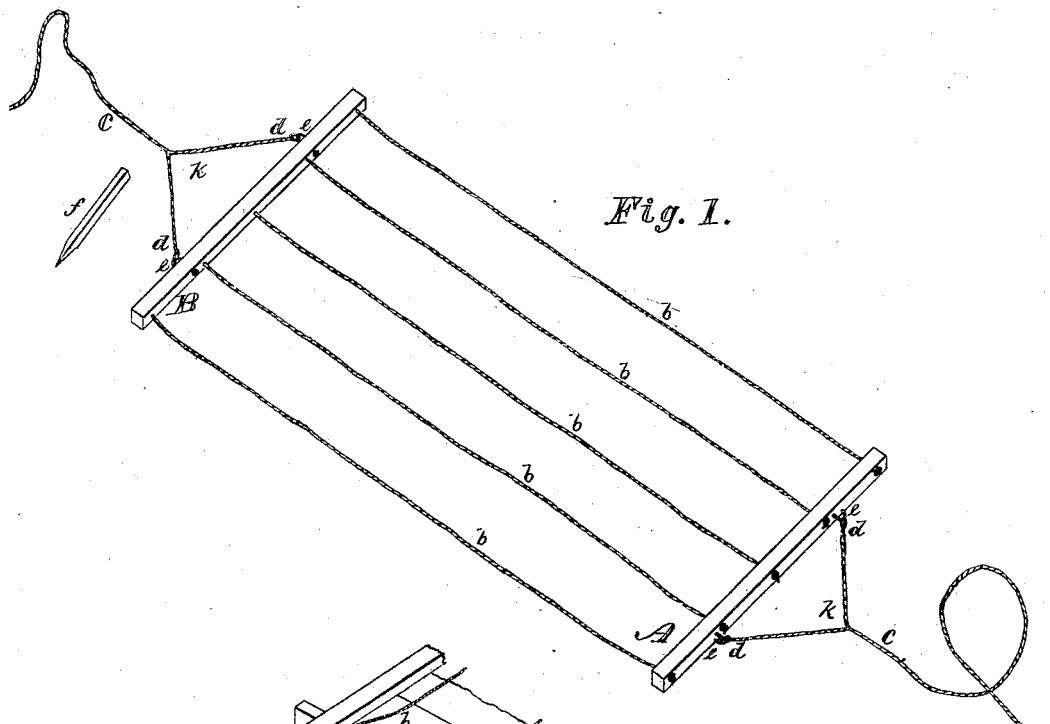
Figure 2:
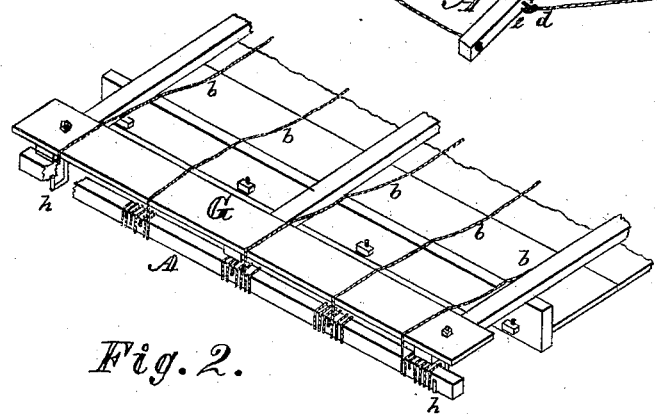

Figure 1 is a detailed view, in perspective, of the mechanism as it would appear if spread upon the ground. Fig. 2 is a view in perspective of one side of a hay-rack, with the binder, unloader, and stacker in position to receive a load of hay that is intended to be bound, unloaded, or stacked.

A B are poles about the length of the wagon-rack, upon which the hay is to be bound and from which the hay is to be unloaded.

b b are ropes connecting the poles A B, and are of sufficient length to wind about once and a half around the load of hay. They are attached to the poles A B by being passed through holes bored through the poles and being knotted on the back side.

c c are draw and anchor ropes, each furnished at one end with a crotch-rope, k, and rings d d at the ends of the crotch-ropes.

e e are hooks made fast to the poles A B.

f is a strong stake, to be driven in the ground for an anchor-stake.

G, Fig. 2, is one side of a hay-rack.

h h are hooks attached to the under side of the edge of the hay-rack.

A shows the pole suspended from the hooks h h under the edge of the rack, as carried while the load is being taken on the wagon.

b b are the ropes shown in position to receive the load of hay.

The best method I have contemplated of using the binder, unloader, and stacker to bind a load of hay on a wagon is described as follows: The ropes b b are wound around the poles A B until there is just sufficient length of rope between the poles A B to reach across the hay-rack and allow the poles A B to rest in the hooks h h on opposite sides of the rack. The side of the rack not shown is arranged in the same manner as the one shown by Fig. 2. The poles A B are placed in the hooks h h and the ropes b b are laid across the rack, as shown. The binder, unloader, and stacker are then in position to receive the load of hay on the wagon. When the load is on the wagon the poles A and B are unrolled from the ropes b b and carried over the load in opposite directions and drawn smartly downward to bring the ropes b b into close contact with the hay. I then have the load securely wound by the several ropes b b and by the weight of the poles A B held firmly in a compact bundle.

To unload or stack the load of hay, I contemplate rolling it from the wagon along the ground or up the inclined side of the stack. I prefer to carry out this feature of my invention by using the binder, unloader, and stacker as follows: For the purposes of this description I will call the pole A the "anchor-pole" and the pole B the "draw-pole." The binder, unloader, and stacker being placed on the hay-rack, as already described for receiving the load of hay, and as shown at Fig. 2, and the hay loaded as described and bound as described, I prefer to proceed as follows to unload: First, the anchor-pole A is taken from the load and laid along the ground parallel to the load and on the line where it is desired to have the edge of the load, which will be next to the wagon when it is unloaded; second, drive the anchor-stake firmly in the ground at a point on the side of the wagon where the anchor-pole is laid, somewhere on a line extending from the center of the load and at right angles to the side of the load, and at such distance from the load that the hay when unloaded will not reach the stake; third, attach the anchor-rope c by the rings d d on the ends of its crotch-rope k to the hooks e e on the anchor-pole A, and lay the anchor-rope along the ground straight away from the load and to the anchor-stake f and make the rope fast to the stake; fourth, attach the draw-rope c to the draw-pole B in the same manner as described for attaching the anchor-rope to the anchor-pole A; fifth, hitch a team to the draw-rope c and drive straight away from the wagon along the line of the anchor-rope, when the hay will be rolled from the wagon. Continue to drive the team until the load has rolled along the ground far enough so the anchor-pole A is drawn from under the load, when the hay will be where it was designed to put it when the anchor-pole A was placed and anchored in position. The draw and anchor ropes can now be unhitched from the anchor and draw poles A and B, when the anchor-rope can be easily drawn backward from under the hay and carried over the unloaded hay, so as to be ready for the next load. The stake as driven will be right for the whole stack, the anchor-rope always passing over the stack. The next load may be deposited by the side of the first, the third on the top of the first and second, and as successive loads are added to the stack the height may be increased as much as desired by always placing and anchoring the anchor-pole A at the point where it is desired to leave the load, the ropes $b\ b$ always acting as skids on which the load is rolled up the inclined side of the stack.

Of the series of ropes $b$ connecting the poles A B, the outside ropes are to be made a little shorter than those between them, so as to cause the ends of the load when being rolled to press toward the center.

Having fully described my invention, what I claim, and desire to secure by Letters Patent, is—

1. The combination of the poles A B and the connecting series of ropes $b$ with the hay-rack G, for the purpose specified.

2. The combination of the poles A B, the series of connecting-ropes $b$, the hooks $e\ e$, made fast to the poles A B, the anchor and draw ropes $c\ c$, with their crotch-ropes $k$ and rings $d\ d$, and the anchor-stake $f$, substantially as described, for the purpose specified.

3. In a hay binding, unloading, and stacking machine, the combination of the poles A B, with the series of connecting-ropes $b$, the anchor and draw ropes $c\ c$, and the anchor-stake $f$, with the hay-rack G, for the purpose of rolling loads of hay from a wagon or along the ground or up the inclined side of a stack.

4. The hooks $h\ h$, attached to the hay-rack, substantially as shown, for the purpose specified.

A. L. THORNTON.

Witnesses:
LUCIUS C. THORNTON,
NETTIE M. HERRICK.